United States Patent

[11] 3,591,857

[72] Inventor Denis Brian Jarvis
Eastleigh, England
[21] Appl. No. 799,359
[22] Filed Feb. 14, 1969
[45] Patented July 6, 1971
[73] Assignee U.S. Philips Corporation
[32] Priority Feb. 16, 1968
[33] Great Britain
[31] 7757/68

[54] MOST TRANSLATING AND GATING CIRCUIT
2 Claims, 1 Drawing Fig.

[52] U.S. Cl. ........ 307/251, 307/205, 307/221, 307/304
[51] Int. Cl. ........ H03k 17/60
[50] Field of Search ........ 307/205, 251, 279, 304, 221

[56] References Cited

UNITED STATES PATENTS

| | | | |
|---|---|---|---|
| 3,395,292 | 7/1968 | Bogert | 307/221 |
| 3,483,400 | 12/1969 | Washizuka et al. | 307/205 |
| 3,506,851 | 4/1970 | Polkinghorn et al. | 307/304 |

OTHER REFERENCES

Sidorsky, MTOS Shift Registers, December 1967, General Instrument Corporation Application Notes, pp. 1— 7, 307/251

*Primary Examiner*—Stanley T. Krawczewicz
*Attorney*—Frank R. Trifari

ABSTRACT: A circuit for a four phase logic system wherein the necessity for a separate bias voltage is eliminated by connecting the source-drain path of an input MOST to the source-drain path of a higher impedance second MOST and by connecting both the gate and drain terminals of the second MOST to a source of clock pulses.

PATENTED JUL 6 1971 3,591,857
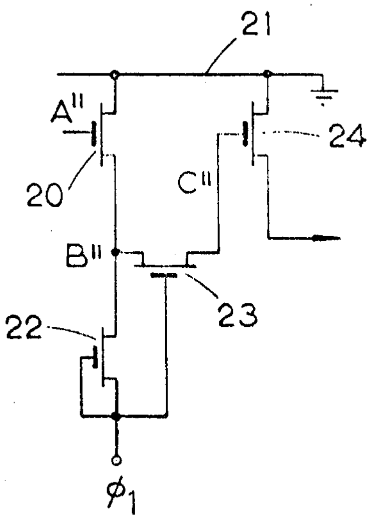
INVENTOR.
DENIS BRIAN JARVIS
BY
Frank R. Trifari
AGENT

MOST TRANSLATING AND GATING CIRCUIT

The present invention is concerned with four phase logic systems employing metallic on insulator on silicon transistors, which are also known as insulated gate field effect transistors. Transistors of this kind will hereinafter be referred to as MOST's.

A basic shift register and a high noise interface are described in our copending U.S. application Ser. No. 799,441, filed Feb. 14, 1969; and the present invention is concerned with an additional circuit to be employed in logic systems of the kind to which the above application relates.

In four-phase logic systems there is a prechange period during periods $\Phi_1$, $\Phi_3$ in which the appropriate logic systems are always taken to a negative value before reaching the true value.

The present invention has for an object to provide a circuit which gives a steady state output (nonreturn to zero) without the use of an additional power supply.

According to the present invention there is provided a logic system comprising a four phase logic circuit using MOST's, the output of which is connected to the input of a pulse to DC logic converter consisting of a known half two-phase shift register connected to an output MOST. The half-two-phase shift register is connected to one of the clock pulse inputs and serves to transfer the output charge of the logic circuit to a point from which it can be sensed by the output MOST.

The present invention will now be described by way of example, and with reference to the accompanying drawing which shows a circuit diagram of a steady state output for a four-phase logic circuit.

The circuit shown in the drawing uses P-channel enhancement and comprises an input MOST 20 which is connected between a ground-line 21 and a MOST 22, which is connected in the source-follower configuration to the $\Phi_1$ input. The MOST 20 is made larger than the MOST 22. A MOST 23 is connected to the junction between MOST 20 and MOST 22 and the gate electrode of MOST 23 is connected to the gate electrode of the MOST 22. The drain electrode of MOST 23 is connected to the gate electrode of a fourth MOST 24 the source electrode of which is connected to the ground-line 21 and the drain electrode of which is the output. It is assumed that the converter is connected to a logical circuit such as the shift register of the interface described in the aforesaid copending patent application.

The charge at point A'', the input point to MOST 20, is stored on the gate capacitance of the MOST between $\Phi_3$ and the end of $\Phi_4$ in a previous logic cycle. During $\Phi_1$ of the next logic cycle point B'' goes negative if A'' is "0," because most 20 will be turned off, and MOST 22 turned on by $\Phi_1$.

Alternatively, if A'' is at a logical "1" (negative) MOST 20 is on, and point B'' is kept substantially at zero. This is because MOST 20 is larger than MOST 22.

MOST 23, in fact, acts as a switch to connect the point B'' to C''. When $\Phi_1$ ends, MOST's 22, 23 are turned off, and the information at C'' remains. This information is sensed by the output MOST 24. It can then be seen that the value at point A'' is transferred to point C'', from which point it can be sampled in a steady state manner.

The circuit has the advantage that additional power supply is not required, and that it is highly suitable for use in an integrated circuit.

It will be seen that the MOST 20, 22, 23 together form a circuit which is virtually identical to half of a known two-phase register. However, the actual function of the converter is totally different to a half a two-phase register, and this is especially so as it is used in a four-phase logic system.

Although only one circuit has been described in this specification, other circuits are possible in which the MOST's 20, 22, 23 are replaced by other circuit elements equivalent to half two-phase shift registers. However, with some designs of two-phase half-shift registers the advantage of requiring no extra power supply may be lost. The invention thus consists in using a known circuit for one logic system in a totally different manner in a second type of logic system.

Although the circuit has been described with reference to P-channel enhancement MOST's it would function equally well with N-channel enhancement MOST's. In such a case the polarity of the pulses would have to be reversed.

I claim:

1. A circuit for a four-phase logic system comprising a first MOST having gate, source and drain terminals, the gate terminal of the first MOST comprising the input terminal of the circuit, means for connecting the source terminal of the first MOST to ground, a second MOST having source, drain and gate terminals, the resistance between the drain and source terminals of the second MOST having a larger value than the resistance between the source and drain terminals of the first MOST for a given voltage on the gate terminals of each of the first and second MOST's, means for connecting the drain terminal of the first MOST to the source terminal of the second MOST, a third MOST having source, drain and gate terminals, means for connecting the source terminals of the second and third MOST's, means for connecting the gate terminal and drain terminal of the second MOST and the gate of the third MOST to a source of clock pulses, a fourth MOST having source, drain and gate terminals, the drain terminal of the fourth MOST comprising the output terminal of the circuit, means for connecting the source terminal of the fourth MOST to ground, and means for connecting the gate terminal of the fourth MOST to the drain terminal of the third MOST.

2. A circuit as claimed in claim 1, wherein each of the MOST's are of the P-channel enhancement type.